United States Patent
Sakamoto

(10) Patent No.: US 10,078,385 B2
(45) Date of Patent: Sep. 18, 2018

(54) LAMINATE MANUFACTURING METHOD, LAMINATE MANUFACTURING APPARATUS, LAMINATE, AND TOUCH PANEL INCLUDING LAMINATE

(71) Applicant: Jun Sakamoto, Osaka (JP)

(72) Inventor: Koji Sakamoto, Osaka (JP)

(73) Assignee: Jun Sakamoto, Osaka (JP)

( * ) Notice: Subject to any disclaimer, the term of this patent is extended or adjusted under 35 U.S.C. 154(b) by 0 days.

(21) Appl. No.: 15/108,204

(22) PCT Filed: Dec. 22, 2014

(86) PCT No.: PCT/JP2014/083919
§ 371 (c)(1),
(2) Date: Jun. 24, 2016

(87) PCT Pub. No.: WO2015/098844
PCT Pub. Date: Jul. 2, 2015

(65) Prior Publication Data
US 2016/0328038 A1    Nov. 10, 2016

(30) Foreign Application Priority Data
Dec. 26, 2013 (JP) .................................. 2013-269207

(51) Int. Cl.
*G06F 3/041*    (2006.01)
*G06F 3/044*    (2006.01)
(Continued)

(52) U.S. Cl.
CPC .............. *G06F 3/041* (2013.01); *B32B 17/06* (2013.01); *B41F 13/193* (2013.01); *B41F 17/00* (2013.01);
(Continued)

(58) Field of Classification Search
CPC ............... B32B 17/06; B32B 2457/208; G06F 2203/04103; G06F 3/041; G06F 3/044; B41F 13/193; B41F 17/00
See application file for complete search history.

(56) References Cited

U.S. PATENT DOCUMENTS 4,861,648 A * 8/1989 Kleinschmidt ....... B30B 15/061
  428/40.7
5,701,815 A * 12/1997 Bocko .................... B41F 17/00
  101/151
(Continued)

FOREIGN PATENT DOCUMENTS

CN    101600332 A    12/2009
JP    H02-048357 U1    4/1990
(Continued)

OTHER PUBLICATIONS

An Office Action issued by the Japanese Patent Office dated Apr. 4, 2017, which corresponds to Japanese Patent Application No. 2015-554884 and is related to U.S. Appl. No. 15/108,204.
(Continued)

*Primary Examiner* — Francis C Gray
(74) *Attorney, Agent, or Firm* — Studebaker & Brackett PC

(57) ABSTRACT

A method for manufacturing a laminate (60) according to the present invention includes: preparing a glass substrate (610) having a main surface (611); and forming a functional layer (660) by gravure offset printing so as to cover the main surface (611) of the glass substrate (610). The functional layer (660) includes at least one of a shatterproof layer, an anti-fingerprint layer, an antireflection layer, and an anti-glare layer, for example.

10 Claims, 4 Drawing Sheets

(51) Int. Cl.
   *B41F 13/193*       (2006.01)
   *B41F 17/00*        (2006.01)
   *B32B 17/06*        (2006.01)

(52) U.S. Cl.
   CPC ........ *G06F 3/044* (2013.01); *B32B 2457/208* (2013.01); *G06F 2203/04103* (2013.01)

(56) References Cited

U.S. PATENT DOCUMENTS

| | | | |
|---|---|---|---|
| 6,995,031 | B2 | 2/2006 | Kondo et al. |
| 7,229,686 | B2 | 6/2007 | Yoshikawa et al. |
| 8,664,533 | B2 | 3/2014 | Yamazaki et al. |
| 8,741,424 | B2 | 6/2014 | Takahashi et al. |
| 8,784,956 | B2 | 7/2014 | Saitou et al. |
| 9,119,305 | B2 | 8/2015 | Takahashi et al. |
| 2004/0033369 | A1* | 2/2004 | Fleming .................. B32B 7/10 428/431 |
| 2004/0058177 | A1 | 3/2004 | Yoshikawa et al. |
| 2005/0284315 | A1 | 12/2005 | Yu et al. |
| 2012/0196103 | A1 | 8/2012 | Murashige et al. |
| 2012/0242610 | A1* | 9/2012 | Yasumatsu ............. G06F 3/045 345/173 |
| 2013/0168138 | A1 | 7/2013 | Yamazaki et al. |
| 2013/0189502 | A1 | 7/2013 | Takahashi et al. |
| 2013/0260114 | A1 | 10/2013 | Saitou et al. |
| 2014/0285737 | A1 | 9/2014 | Takahashi et al. |
| 2015/0010731 | A1 | 1/2015 | Iwata et al. |
| 2015/0221506 | A1* | 8/2015 | Fujdala ............. H01L 21/02565 257/43 |

FOREIGN PATENT DOCUMENTS

| | | |
|---|---|---|
| JP | H06-028098 A | 2/1994 |
| JP | H10-080660 A | 3/1998 |
| JP | 2000-167977 A | 6/2000 |
| JP | 2000-218731 A | 8/2000 |
| JP | 2004-117704 A | 4/2004 |
| JP | 2006-335995 A | 12/2006 |
| JP | 2006-343920 A | 12/2006 |
| JP | 2007-229683 A | 9/2007 |
| JP | 2008-168578 A | 7/2008 |
| JP | 2008168578 A * | 7/2008 |
| JP | 2009-295980 A | 12/2009 |
| JP | 2009295980 A * | 12/2009 |
| JP | 2010-191169 A | 9/2010 |
| JP | 2011-086786 A | 4/2011 |
| JP | 2011-088789 A | 5/2011 |
| JP | 2012-181815 A | 9/2012 |
| JP | 2013-029919 A | 2/2013 |
| JP | 5177607 B1 | 4/2013 |
| JP | 2013-091047 A | 5/2013 |
| JP | 2013-171262 A | 9/2013 |
| JP | 5390628 B2 | 1/2014 |
| JP | 2015-000822 A | 1/2015 |
| JP | 5857965 B2 | 2/2016 |
| WO | 2011/043367 A1 | 4/2011 |
| WO | 2012/005205 A1 | 1/2012 |
| WO | 2012/032920 A1 | 3/2012 |

OTHER PUBLICATIONS

An Office Action issued by the Taiwanese Patent Office dated Jan. 25, 2017, which corresponds to Taiwanese Patent Application No. 10620097360 and is related to U.S. Appl. No. 15/108,204.

An Office Action issued by the Chinese Patent Office dated Feb. 28, 2017, which corresponds to Chinese Patent Application No. 201480071017.4 and is related to U.S. Appl. No. 15/108,204.

An Office Action issued by the Japanese Patent Office dated Aug. 29, 2017, which corresponds to Japanese Patent Application No. 2015-554884 and is related to U.S. Appl. No. 15/108,204.

International Search Report issued in PCT/JP2014/083919; dated Mar. 10, 2015.

An Office Action; issued by the Taiwanese Patent Office dated Apr. 7, 2016.

\* cited by examiner

LAMINATE MANUFACTURING METHOD, LAMINATE MANUFACTURING APPARATUS, LAMINATE, AND TOUCH PANEL INCLUDING LAMINATE

TECHNICAL FIELD

The present invention relates to a laminate manufacturing method, a laminate manufacturing apparatus, a laminate, and a touch panel including the laminate.

BACKGROUND ART

It has been known that formation of a functional layer on a glass substrate constituting a display screen of a display device imparts a specific function to the display device. For example, Patent Literature 1 discloses a stain-proof touch panel substrate in which an stain-proof film is disposed on a surface of a glass substrate to increase easiness of wiping off fingerprints. Further, Patent Literature 2 discloses a shatterproof film to be attached to a surface of a glass substrate for preventing the glass substrate from shattering upon breakage of the glass substrate.

CITATION LIST

Patent Literature

[Patent Literature 1]
Japanese Patent Application Laid-Open Publication No. 2013-091047
[Patent Literature 2]
Japanese Patent Application Laid-Open Publication No. 2013-029919

SUMMARY OF INVENTION

Technical Problem

The functional layer disclosed in Patent Literature 1 is formed in a manner to heat a composition constituting the functional layer deposited on the glass substrate. The functional layer disclosed in Patent Literature 2 is attached to the glass substrate using an adhesive. However, throughput times for formation of the respective functional layers in the Patent Literatures 1 and 2 are long, thereby resulting in poor mass productivity.

The present invention has been made in view of the foregoing and has an object of providing a laminate manufacturing method, a laminate manufacturing apparatus, a laminate, and a touch panel including the laminate that have mass productivity increased by shortening throughput time for formation of a functional layer on a glass substrate.

Solution to Problem

In order to achieve to the above object, a laminate manufacturing method according to the present invention includes preparing a glass substrate having a main surface, and forming a functional layer by gravure offset printing so as to cover the main surface of the glass substrate.

In one embodiment, the functional layer includes at least one of a shatterproof layer, an anti-fingerprint layer, an antireflection layer, and an anti-glare layer.

In one embodiment, the forming a functional layer includes: preparing a printing plate, a blanket for offset printing having a surface, and a functional layer composition; transferring the functional layer composition from the printing plate to the blanket; and transferring the functional layer composition to the main surface of the glass substrate from the blanket.

In one embodiment in the laminate manufacturing method according to the present invention, the transferring to the blanket and the transferring to the main surface of the glass substrate are repeated plural times.

In one embodiment, the surface of the blanket includes a recess formation region. The recess formation region includes a plurality of recessed regions each defining a recess, and a plurality of upper regions defined by adjacent recessed regions among the plurality of recessed regions. The plurality of upper regions each include an upper surface. The recesses each have a bottom surface parallel to the upper surfaces.

In order to achieve the above object, a laminate manufacturing method according to the present invention is a laminate manufacturing apparatus for manufacturing a laminate by the aforementioned laminate manufacturing method. The laminate manufacturing apparatus includes: a printing plate; a blanket for offset printing having a surface; and a supply section configured to supply a functional layer composition for forming the functional layer to the printing plate. The blanket transfers to the glass substrate the functional layer composition transferred from the printing plate.

In one embodiment, the surface of the blanket includes a recess formation region. The recess formation region includes a plurality of recessed regions each defining a recess, and a plurality of upper regions defined by adjacent recessed regions among the plurality of recessed regions. The plurality of upper regions each include an upper surface. The recesses each have a bottom surface parallel to the upper surfaces.

In one embodiment, the plurality of recessed regions are greater than the plurality of upper regions in the recess formation region.

In order to achieve the above object, a laminate according to the present invention includes: a glass substrate having a main surface; and a functional layer formed by gravure offset printing so as to cover the main surface of the glass substrate.

In order to achieve the above object, a touch panel according to the present invention includes the aforementioned laminate.

Advantageous Effects of Invention

In the laminate manufacturing method according to the present invention, throughput time for formation of the functional layer on the glass substrate can be shortened and mass productivity can be increased.

DESCRIPTION OF EMBODIMENTS

With reference to the accompanying drawings, description will be made below about embodiments of a laminate manufacturing method, a laminate, and a touch panel including the laminate. Note that the present invention is not limited to the following embodiments.

Figure 1:
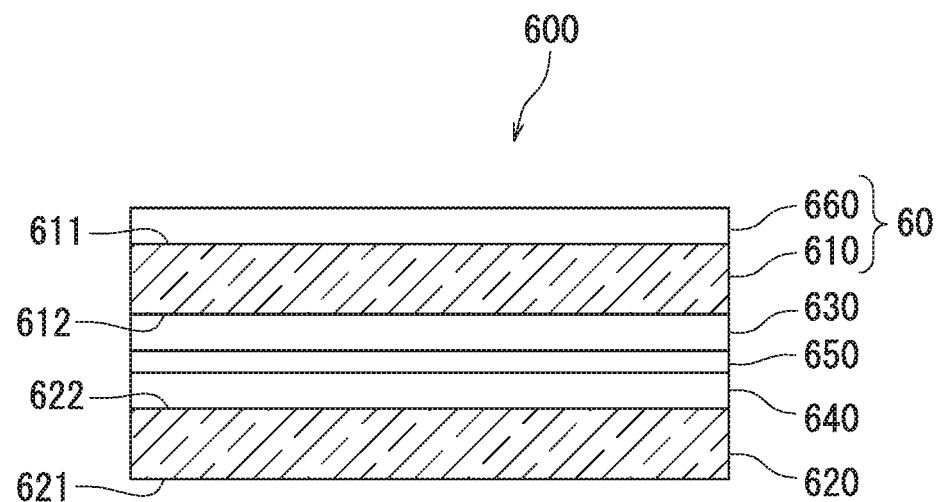
FIG. 1 is a schematic diagram illustrating a touch panel according to an embodiment of the present invention.

FIG. 1 is a schematic diagram illustrating a touch panel 600 according to an embodiment of the present invention. Here, an electrostatic capacitance type touch panel will be described as an example of the touch panel 600. The touch panel 600 includes a glass substrate 610, a glass substrate 620, a first electrode layer 630, a second electrode layer 640, an adhesive layer 650, and a functional layer 660.

The glass substrate 610 is in a flat plate-like shape and has transmissivity. The glass substrate 610 is disposed on a side of the touch panel 600 on which an observer is present (a side on which a user operates the touch panel 600) and includes a first main surface 611 facing the observer of the touch panel 600 and a second main surface 612 opposite to the first main surface 611. The functional layer 660 is disposed on the first main surface 611 of the glass substrate 610. The first electrode layer 630 is disposed on the second main surface 612 of the glass substrate 610.

The functional layer 660 covers at least a part of the first main surface 611 of the glass substrate 610 to impart a specific function to the touch panel 600. The functional layer 660 in the present embodiment is a shatterproof layer. In a situation in which the glass substrate 610 is broken upon impact such as a fall, the functional layer 660 prevents pieces of the shattered glass substrate 610 from scattering.

Any known shatterproof material can be used as a material of the functional layer 660. Examples of materials that can be used for the functional layer 660 include materials of photosetting resin type, thermosetting resin type, and a reaction liquid type of two-liquid mixture. Among the above, the photosetting resin type materials include radical curing materials and cationic curing materials. Examples of the radical curing materials include acrylic-based materials, ene-thiol based materials, and vinyl ether-based materials. Examples of the cationic curing materials include epoxy-based, oxetane-based, and vinyl ether-based materials. Examples of the thermosetting type materials include epoxy-based materials, phenol-based materials, and polyester-based materials.

The glass substrate 620 is in a flat plate-like shape and has transmissivity. The glass substrate 620 is disposed on a side of the touch panel 600 on which a display device (e.g., a liquid crystal monitor, not illustrate) is disposed, and includes a first main surface 621 facing the display device and a second main surface 622 opposite to the first main surface 621. The second electrode layer 640 is disposed on the second main surface 622 of the glass substrate 620. The glass substrates 610 and 620 are bonded together through the adhesive layer 650 between the first and second electrode layers 630 and 640.

The first and second electrode layers 630 and 640 of the touch panel 600 detect variation in electrostatic capacitance caused by a finger touch on the functional layer 660, and specify a touch point based on the detected variation in electrostatic capacitance.

Figure 2:
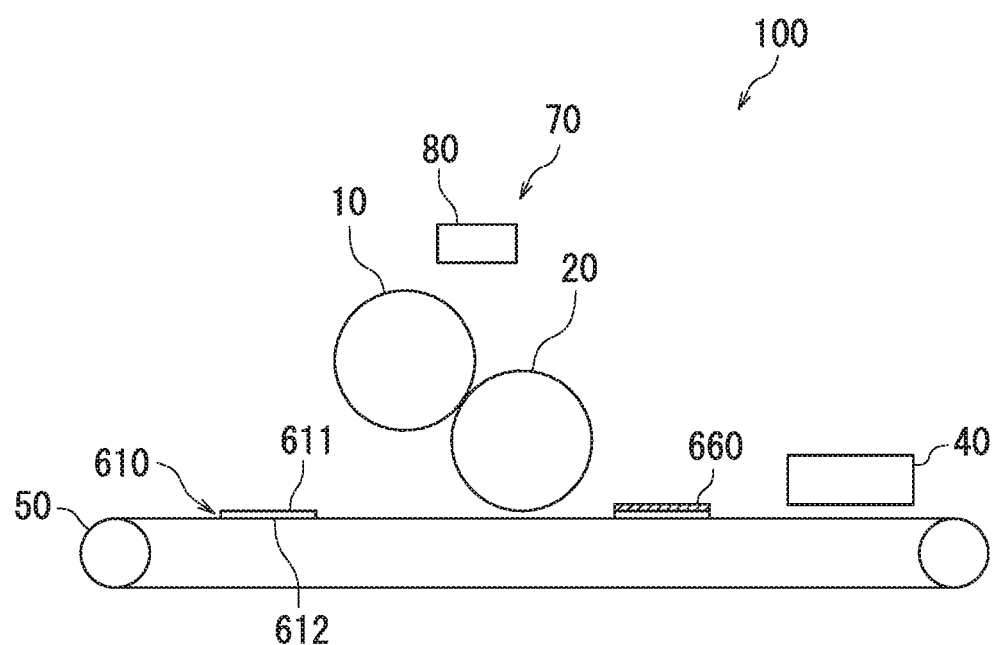
FIG. 2 is a schematic diagram illustrating a laminate manufacturing method according to the embodiment.

The laminate 60 according to the present invention includes the glass substrate 610 and the functional layer 660 in the present embodiment. FIG. 2 is a schematic diagram illustrating a method for manufacturing the laminate 60 according to the present embodiment. The method for manufacturing the laminate 60 will be described below with reference to FIG. 2.

The glass substrate 610 is prepared first.

Figure 3A:
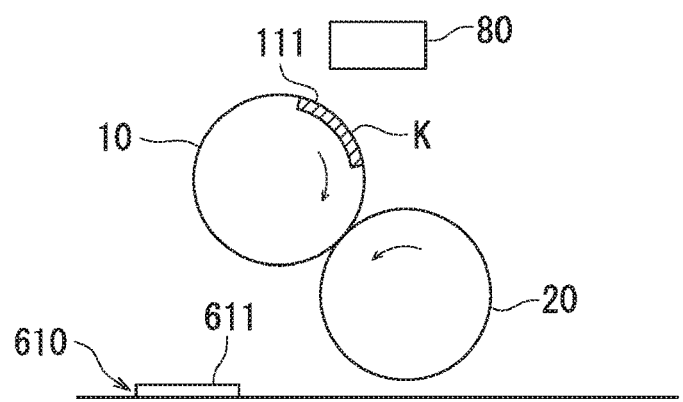
FIGS. 3A, 3B, and 3C are schematic diagrams each illustrating a process of forming a functional layer.
Figure 3B:
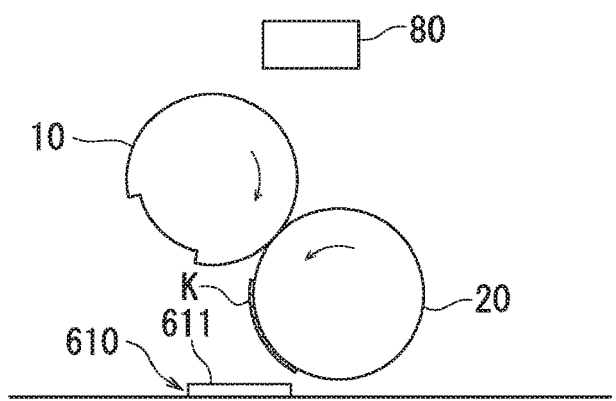
Figure 3C:
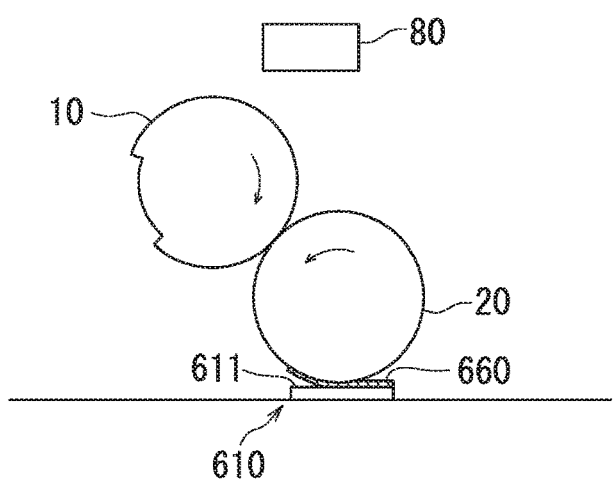

The functional layer 660 is then formed so as to cover the first main surface 611 of the glass substrate 610 using a gravure offset printing apparatus 100. FIGS. 3A, 3B, and 3C are schematic diagrams each illustrating a process of forming the functional layer 660. The processes of forming the functional layer 660 will be described in detail below with reference to FIGS. 2 and 3A-3C.

The gravure offset printing apparatus 100 illustrated in FIG. 2 is prepared. The gravure offset printing apparatus 100 includes a printer 70. The gravure offset printing apparatus 100 further includes a conveyance section 50 that conveys the glass substrate 610. The printer 70 includes a pattern roll 10, a transfer roll 20, and a supply section. The pattern roll 10 and the transfer roll 20 each are rotatable. A groove 111 (see FIG. 3A) in a specific pattern is formed in the pattern roll 10. The pattern corresponds to the shape of the first main surface 611 of the glass substrate 610. A blanket is disposed on a surface of the transfer roll 20. The blanket is made of rubber, for example. The supply section 80 supplies a functional layer composition K for forming the functional layer 660 to the pattern roll 10.

As illustrated in FIG. 3A, the functional layer composition K for forming the functional layer 660 is supplied to the groove 111 in the pattern roll 10. Note that the transfer roll 20 and the pattern roll 10 rotate at the same angular velocity. Supply of the functional layer composition K to the pattern roll 10 is performed by the supply section 80. For example, the supply section 80 may drip the functional layer composition K from above the pattern roll 10. Alternatively, the supply section 80 may serve as a functional layer composition retainer and the functional layer composition K may be supplied from the functional layer composition retainer. Or, the supply section 80 may be a nozzle to eject the functional layer composition K toward the pattern roll 10.

As illustrated in FIG. 3B, the pattern roll 10 transfers the functional layer composition K to the transfer roll 20. Upon the functional layer composition K on the rotating pattern roll 10 coming into contact with the transfer roll 20, the functional layer composition K is transferred to the transfer roll 20.

As illustrated in FIG. 3C, the transfer roll 20 transfers the functional layer composition K to the first main surface 611 of the glass substrate 610. Upon the functional layer composition K on the rotating transfer roll 20 coming into contact with the first main surface 611 of the glass substrate 610, the functional layer composition K is transferred to the first main surface 611 of the glass substrate 610. Through the above processes, the functional layer 660 is formed on the first main surface 611 of the glass substrate 610.

Note that post processing may be performed on the functional layer composition K transferred to the first main surface 611 of the glass substrate 610 as necessary. For example, in a situation in which a thermosetting resin type material is used as a material of the functional layer 660, the gravure offset printing apparatus 100 may further include a heater 40, as illustrated in FIG. 2. Heating by the heater 40 hardens the functional layer composition K to form the functional layer 660. By contrast, in a situation in which a photosetting resin type material is used as a material of the functional layer 660, the gravure offset printing apparatus 100 may further includes a light irradiating device (not illustrated). Irradiation of the functional layer composition K with a light having a specific wavelength hardens the functional layer composition K to form the functional layer 660.

The method for manufacturing the laminate 60, the laminate 60, and the touch panel 600 according to the present embodiment have been described so far with reference to FIGS. 1-3C. The functional layer 660 in the present embodiment is printed and formed on at least a part of the first main surface 611 of the glass substrate 610 by the gravure offset printing apparatus 100. High-speed continuous printing by the gravure offset printing apparatus 100 can shorten throughput time for formation of the functional layer 660 on the first main surface 611 of the glass substrate 610, thereby increasing mass productivity of the laminate 60. Furthermore, the gravure offset printing apparatus 100 can form the functional layer 660 even on the glass substrate 610 having a curved first main surface 611 or a large-sized glass substrate, for example.

Figure 4A:
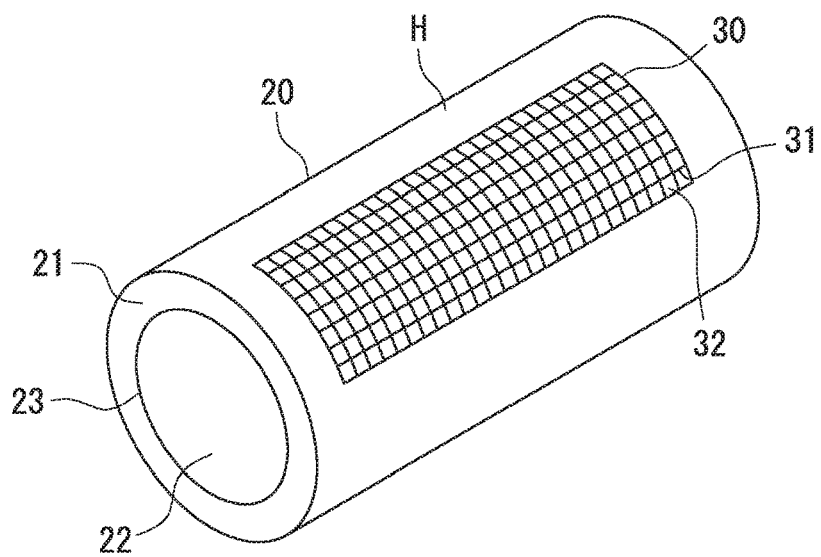
FIG. 4A is a schematic diagram illustrating a transfer roll according to the embodiment.
Figure 4B:
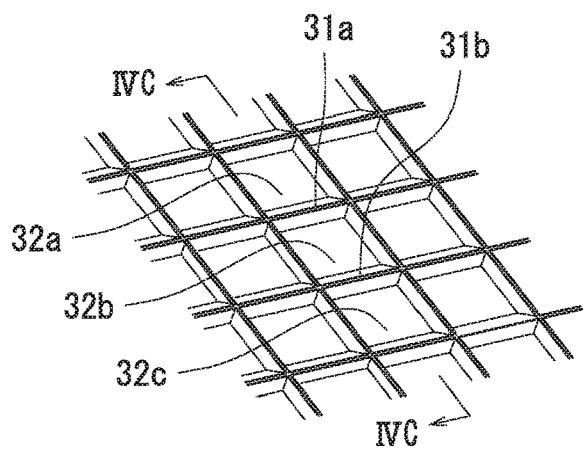
FIG. 4B is an schematic enlarged view of a recess formation region illustrated in FIG. 4A.
Figure 4C:
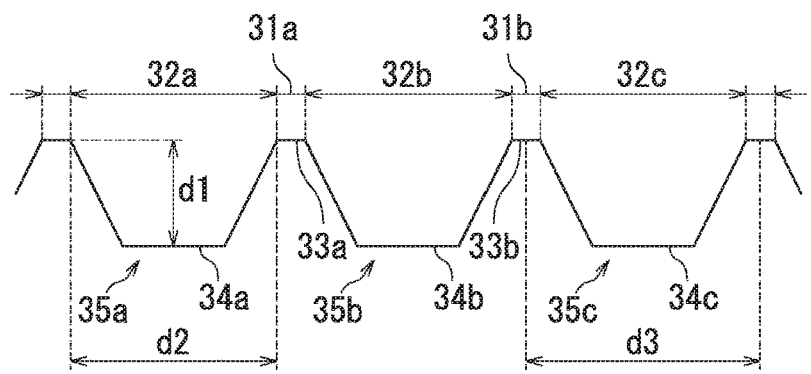
FIG. 4C is a schematic cross sectional view taken along a line IVC-IVC in FIG. 4B.

Note that in the laminate manufacturing method according to the present invention, the functional layer 660 can be formed by the gravure offset printing apparatus including the transfer roll 20 described with reference to FIGS. 4A-4C. FIG. 4A is a schematic diagram illustrating the transfer roll 20 of the gravure offset printing apparatus 100 according to the embodiment of the present invention. FIG. 4B is a schematic enlarged view of a recess formation region illustrated in FIG. 4A. FIG. 4C is a schematic cross sectional view taken along a line IVC-IVC in FIG. 4B.

The transfer roll 20 will be described with reference to FIG. 4A. The transfer roll 20 includes a blanket 21 and a core 22. The core 22 has an outer circumferential surface 23. The blanket 21 is mounted on the outer circumferential surface 23 of the core 22.

The blanket 21 has a surface H having a recess formation region 30. The recess formation region 30 includes a plurality of recessed regions 32 and a plurality of upper regions 31. The recessed regions 32 each define a recess. The recesses are arranged in a lattice formation. The upper regions 31 communicate the plurality of recessed regions 32.

The recess formation region 30 will be described with reference to FIGS. 4B and 4C. The recess formation region 30 includes the plurality of recessed regions 32 (recessed regions 32a, 32b, and 32c) and the plurality of upper regions 31 (upper regions 31a and 31b). The recessed regions 32 each have a recess (recesses 35a, 35b, and 35c). The upper regions 31 each are defined by adjacent recessed regions 32. The plurality of recesses (recesses 35a, 35b, and 35c) each have a bottom surface (bottom surfaces 34a, 34b, and 34c) parallel to upper surfaces (upper surfaces 33a and 33b).

The plurality of recessed regions 32 in the recess formation region 30 is greater than the upper regions 31. An occupation rate of the recessed regions 32 in the recess formation region 30 is 50% to 95%, for example. When the blanket 21 is mounted on the core 22, the bottom surfaces are located along the surface of the core 22. In a situation in which the blanket 21 is disposed on the core 22, the upper surfaces are located along the surface of the core 22.

The plurality of recesses 35 each have a depth d1 greater than 0 mm and no greater than 3 mm, for example. Preferably, the depth d1 is at least 0.3 mm and no greater than 0.4 mm. The plurality of recesses 35 each have a size d2 of at least 30 μm and no greater than 1000 μm, for example. Intervals d3 between respective recesses are at least 30 μm and no greater than 1000 μm, for example.

The transfer roll 20 according to the present embodiment that is used in the laminate manufacturing method has been described so far with reference to FIG. 4. The plurality of upper regions in the blanket 21 of the transfer roll 20 have the upper surfaces. The plurality of recesses have the bottom surfaces parallel the upper surfaces. The recesses can retain the functional layer composition. In the above configuration of the transfer roll 20 according to the present embodiment, the amount of the functional layer composition that can be transferred in one time printing can be increased, thereby enabling printing of a thick functional layer 660 on the first main surface 611 of the glass substrate 610. As a result, shatterproof effect of the functional layer 660 can be enhanced.

Further, the plurality of recessed regions are greater than the upper regions in the recess formation region. In the above configuration, much more amount of the functional layer composition can be retained in the plurality of recesses, thereby enabling printing of the thick functional layer 660 on the first main surface 611 of the glass substrate 610. As a result, shatterproof effect of the functional layer 660 can be enhanced.

Note that the functional layer 660 in the aforementioned embodiment is a shatterproof layer, which however should not be taken to limit the present invention. The functional layer 660 may be an anti-fingerprint layer, antireflection layer, or anti-glare layer. Any known anti-fingerprint materials, antireflection materials, or anti-glare materials may be used in the respective situations.

Figure 5:
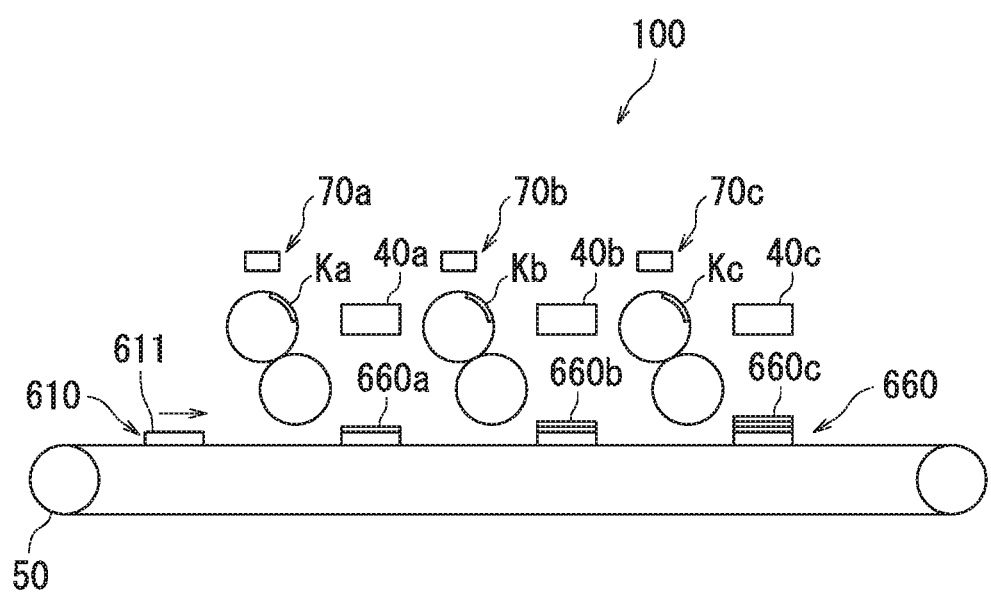
FIG. 5 is a diagram explaining a gravure offset printing apparatus used in a laminate manufacturing method according to another embodiment of the present invention.

Furthermore, the functional layer 660 is formed on the first main surface 611 of the glass substrate 610 through one-time printing in the laminate manufacturing method according to the aforementioned embodiment, which however should not be taken to limit the present invention, as described with reference to FIG. 5. FIG. 5 is a diagram explaining a gravure offset printing apparatus 100 used in a laminate manufacturing method according to another embodiment of the present invention. With reference to FIG. 5, description will be made about the gravure offset printing apparatus 100 and processes of forming the functional layer 660 by the gravure offset printing apparatus 100 according to the present embodiment.

The gravure offset printing apparatus 100 includes a printer 70a, a printer 70b, a printer 70c, a heater 40a, a heater 40b, a heater 40c, and a conveyance section 50. The printers 70a, 70b, and 70c each have the same configuration as the printer 70 described with reference to FIG. 2, and therefore, detailed description thereof is omitted.

In formation of the functional layer 660, the printer 70a first prints a functional layer composition Ka on the first main surface 611 of the glass substrate 610. Subsequently, the heater 40a heats the functional layer composition Ka to form a functional layer 660a. The printer 70b then prints a functional layer composition Kb on the functional layer composition Ka. Subsequently, the heater 40b heats the functional layer composition Kb to form a functional layer 660b. The printer 70c then prints a functional layer composition Kc on the functional layer composition Kb. Subsequently, the heater 40c heats the functional layer composition Kc to form a functional layer 660c.

Coating the functional layers in a layered manner as above can laminate the functional layers. For example, in a situation in which the same shatterproof material is used for the functional layer compositions Ka, Kb, and Kc, a thick shatterproof layer can be formed on the first main surface 611 of the glass substrate 610. Alternatively, different materials may be used for the respective functional layer compositions Ka, Kb, and Kc. For example, in a situation in which a shatterproof material, an antireflection material, and an anti-fingerprint material are used for the functional layer compositions Ka, Kb, and Kc, respectively, a shatterproof layer, an anti-reflection layer, and an anti-fingerprint layer can be laminated on the first main surface 611 of the glass substrate 610.

Note that an electrostatic capacitance type touch panel is described as an example of the touch panel in the above-described embodiments, which however should not be taken to limit the present invention. The touch panel may be a touch panel of resistive film type, electromagnetic induction type, or infrared ray type. Any known configuration can be adopted for these touch panels. Therefore, detailed description and presentation of a figure are omitted.

INDUSTRIAL APPLICABILITY

The laminate manufacturing method according to the present invention is favorably used for manufacturing a laminate used in a touch panel. In the laminate manufacturing method according to the present invention, a functional layer can be directly formed on a glass substrate by gravure offset printing.

REFERENCE SINGS LIST 10 pattern roll
111 groove
20 transfer roll
21 blanket
22 core
23 outer circumferential surface
30 recess formation region
31, 31a, 31b upper region
32, 32a, 32b, 32c recessed region
33a, 33b upper surface
34a, 34b, 34c bottom surface
40, 40a, 40b, 40c heater
50 conveyance section
600 touch panel
610 glass substrate
611 first main surface
612 second main surface
620 glass substrate
630 first electrode layer
640 second electrode layer
650 adhesive layer
660 functional layer
70, 70a, 70b, 70c printer
80 supply section
100 printing apparatus

The invention claimed is:

1. A laminate manufacturing method comprising:
preparing a glass substrate having a main surface;
preparing a gravure offset printing apparatus including a pattern roll and a transfer roll; and
forming a functional layer by gravure offset printing using the gravure offset printing apparatus so as to cover an entirety of a predetermined region in the main surface of the glass substrate.

2. The laminate manufacturing method according to claim 1, wherein
the forming a functional layer includes:
preparing a functional layer composition;
transferring the functional layer composition from the pattern roll to the transfer roll; and
transferring the functional layer composition to the main surface of the glass substrate from the transfer roll.

3. The laminate manufacturing method according to claim 2, wherein
the transferring to the transfer roll and the transferring to the main surface of the glass substrate are repeated plural times.

4. The laminate manufacturing method according to claim 1, wherein
the transfer roll includes a blanket for offset printing having a surface,
the surface of the blanket includes a recess formation region,
the recess formation region includes a plurality of recessed regions each defining a recess, and a plurality of upper regions defined by adjacent recessed regions among the plurality of recessed regions,
the plurality of upper regions each include an upper surface, and
the recesses each have a bottom surface parallel to the upper surfaces.

5. A laminate manufacturing apparatus for manufacturing a laminate by the laminate manufacturing method according to claim 1, the laminate manufacturing apparatus comprising:
a pattern roll;
a transfer roll; and
a supply section configured to supply a functional layer composition for forming the functional layer to the pattern roll, wherein
the transfer roll transfers to the glass substrate the functional layer composition transferred from the pattern roll.

6. The laminate manufacturing apparatus according to claim 5, wherein
the transfer roll includes a blanket for offset printing having a surface,
the surface of the blanket includes a recess formation region,
the recess formation region includes a plurality of recessed regions each defining a recess, and a plurality of upper regions defined by adjacent recessed regions among the plurality of recessed regions,
the plurality of upper regions each include an upper surface, and
the recesses each have a bottom surface parallel to the upper surfaces.

7. The layered member manufacturing apparatus according to claim 6, wherein
an area ratio of the plurality of recessed regions to the recess formation region is larger than an area ratio of the plurality of upper regions to the recess formation region.

8. The laminate manufacturing method according to claim 1, wherein
the functional layer includes at least one of a shatterproof layer, an anti-fingerprint layer, an antireflection layer, and an anti-glare layer.

9. The laminate manufacturing method according to claim 4, wherein
the recess has a depth of at least 0.3 mm and no greater than 3 mm.

10. The laminate manufacturing method according to claim 1, wherein
in forming a functional layer, the functional layer covers an entirety of the main surface of the glass substrate.

* * * * *